(12) United States Patent
Yoo et al.

(10) Patent No.: US 9,450,531 B2
(45) Date of Patent: Sep. 20, 2016

(54) CONTROL METHOD OF WASHING MACHINE

(71) Applicants: Heakyung Yoo, Seoul (KR); Cheolsoo Ko, Seoul (KR)

(72) Inventors: Heakyung Yoo, Seoul (KR); Cheolsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 13/755,131

(22) Filed: Jan. 31, 2013

(65) Prior Publication Data

US 2013/0200833 A1    Aug. 8, 2013

(30) Foreign Application Priority Data

Feb. 1, 2012    (KR) .................. 10-2012-0010351

(51) Int. Cl.
  *G05B 11/28*    (2006.01)
  *H02P 29/00*    (2016.01)
  *D06F 35/00*    (2006.01)

(52) U.S. Cl.
  CPC ......... *H02P 29/0011* (2013.01); *D06F 35/007* (2013.01)

(58) Field of Classification Search
  CPC .......... G05B 11/28; H02P 7/29; G05D 3/121
  USPC .................. 318/599, 811; 388/800, 811, 819
  See application file for complete search history.

(56) References Cited

U.S. PATENT DOCUMENTS

| | | | | |
|---|---|---|---|---|
| 5,361,439 A | * | 11/1994 | Malchow | .......................... 8/158 |
| 5,596,889 A | * | 1/1997 | Guerra et al. | ............... 68/12.02 |
| 5,890,247 A | * | 4/1999 | Erickson et al. | .................. 8/158 |
| 7,490,490 B2 | * | 2/2009 | Hirasawa et al. | ........... 68/12.04 |
| 2005/0016227 A1 | * | 1/2005 | Lee | ........................ D06F 37/203 68/12.04 |
| 2005/0028296 A1 | | 2/2005 | Lee et al. | ........................... 8/158 |
| 2005/0044640 A1 | | 3/2005 | Hyeong | ............................ 8/159 |
| 2008/0196172 A1 | | 8/2008 | Jeong | ................................ 8/159 |
| 2009/0183318 A1 | * | 7/2009 | Kim et al. | ........................ 8/159 |
| 2009/0300936 A1 | * | 12/2009 | Kim et al. | ...................... 34/312 |

(Continued)

FOREIGN PATENT DOCUMENTS

CN    1187552 A    7/1998
EP    0 481 442 A2    4/1992

OTHER PUBLICATIONS

European Search Report dated Jun. 11, 2013 issued in Application No. 13 00 0361.

(Continued)

*Primary Examiner* — Rina Duda
(74) *Attorney, Agent, or Firm* — KED & Associates LLP

(57) ABSTRACT

Disclosed is a control method of a washing machine. The method includes performing first-stage rotation in which a drum is rotated at a predetermined rotational speed, performing second-stage rotation in which the drum is rotated at a first target RPM when a predetermined time has passed after the first-stage rotation ends, performing deceleration rotation in which the rotational speed of the drum is kept at a lower value than in the second-stage rotation, and performing third-stage rotation in which the drum is rotated at a second target RPM that is greater than the rotational speed of the drum in the deceleration rotation. Accordingly, it is possible to prevent laundry from being adhered to an inner surface of the drum during removal of moisture contained in laundry, and to achieve an increased contact area between laundry and hot air via uniform dispersion of laundry, resulting in enhanced laundry drying performance.

14 Claims, 5 Drawing Sheets

(56) References Cited

U.S. PATENT DOCUMENTS

| | | | |
|---|---|---|---|
| 2010/0000267 A1 | 1/2010 | Leidig et al. | 68/23 |
| 2010/0322819 A1* | 12/2010 | Kim et al. | 422/5 |
| 2011/0016639 A1* | 1/2011 | Kim | 8/137 |
| 2011/0067185 A1* | 3/2011 | Koo | D06F 35/007 8/137 |
| 2012/0005840 A1* | 1/2012 | Jang | D06F 33/02 8/137 |

OTHER PUBLICATIONS

Chinese Office Action dated Jun. 10, 2015 issued in Application No. 201310041249.2.

* cited by examiner

CONTROL METHOD OF WASHING MACHINE

Pursuant to 35 U.S.C. §119(a), this application claims the benefit of Korean Patent Application No. 10-2012-0010351, filed on Feb. 1, 2012, which is hereby incorporated by reference as if fully set forth herein.

BACKGROUND OF THE INVENTION

1. Field of the Invention

The present invention relates to a control method of a washing machine, and more particularly to a control method of a washing machine capable of efficiently removing moisture contained in laundry.

2. Discussion of the Related Art

In general, a washing machine performs a washing cycle, a rinsing cycle, and a dehydration cycle. Here, the dehydration cycle involves rotating a drum at the highest speed as compared in those of other cycles. Thus, the dehydration cycle may disadvantageous cause increased noise and vibration, so there is a need for solution of this drawback.

Typically, a conventional washing machine includes a tub in which wash water is accommodated. A drum in which laundry is disposed is rotatably installed within the tub. The drum is connected to a rotating shaft, and a motor is used to rotate the rotating shaft. The rotating shaft is rotatably supported via a bearing housing that is in turn installed to a rear wall of the tub. A suspension is connected to the tub and serves to absorb vibration of the drum and the tub.

To achieve a drying function, the washing machine includes a heater duct and a condensing duct. The heater duct is located above the tub and contains a heater and a fan installed therein. The condensing duct is connected at one end thereof to the tub and at the other end thereof to the heater duct.

The washing apparatus generally performs dehydration or drying to remove moisture contained in laundry as a final-stage process. The goal of the corresponding process is to more effectively remove moisture contained in laundry.

SUMMARY OF THE INVENTION

Accordingly, the present invention is directed to a control method of a washing machine that substantially obviates one or more problems due to limitations and disadvantages of the related art.

An object of the present invention is to provide a laundry treatment method capable of more efficiently removing moisture contained in laundry.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a washing machine, includes performing first-stage rotation in which a drum is rotated at a predetermined rotational speed, performing second-stage rotation in which the drum is rotated at a first target RPM when a predetermined time has passed after the first-stage rotation ends, performing deceleration rotation in which the rotational speed of the drum is kept at a lower value than in the second-stage rotation, and performing third-stage rotation in which the drum is rotated at a second target RPM that is greater than the rotational speed of the drum in the deceleration rotation.

The first-stage rotation may include sensing the amount of wet laundry.

The second-stage rotation may include first acceleration in which the drum is accelerated to the first target RPM and first constant-speed rotation in which the drum is rotated at the first target RPM for a first time, and the third-stage rotation may include second acceleration in which the drum is accelerated to the second target RPM and second constant-speed rotation in which the drum is rotated at the second target RPM for a second time.

The deceleration rotation may include iteratively performing a set of rotation and pause of the drum.

The first target RPM may differ from the second target RPM.

The second target RPM may be greater than the first target RPM.

The first time and the second time may differ from each other.

The second time may be greater than the first time.

The deceleration rotation may be performed for a greater time than in the second-stage rotation and in the third-stage rotation.

The deceleration rotation may include supplying hot air into the drum via a heater.

The hot air may be supplied when a predetermined time has passed after the deceleration rotation begins.

Actuation of the heater may stop and heated air within the drum may be circulated when the third-stage rotation begins.

The hot air may be supplied into the drum after the third-stage rotation ends.

The deceleration rotation in which the rotational speed of the drum may be kept at a lower value than in the second-stage rotation is performed after the third-stage rotation ends.

The first-stage rotation may include disentangling laundry to disperse laundry within the drum, and sensing eccentricity of the drum.

In accordance with another aspect of the present invention, a control method of a washing machine, includes performing first-stage rotation in which a drum is rotated at a predetermined rotational speed, performing second-stage rotation in which the drum is rotated at a first target RPM when a predetermined time has passed after the first-stage rotation ends, performing deceleration rotation in which the rotational speed of the drum is kept at a lower value than in the second-stage rotation and hot air is supplied into the drum via a heater, and performing third-stage rotation in which the drum is rotated at a second target RPM that differs from the first target RPM and is greater than the rotational speed of the drum in the deceleration rotation.

The deceleration rotation may include iteratively performing a set of rotation and pause of the drum.

Actuation of the heater may stop and heated air within the drum may be circulated when the third-stage rotation begins.

In accordance with a further aspect of the present invention, a control method of a washing machine, includes performing first-stage rotation in which a drum is rotated at a predetermined rotational speed, performing second-stage rotation including first acceleration in which the drum is accelerated to a first target RPM when a predetermined time has passed after the first-stage rotation ends and first constant-speed rotation in which the drum is rotated at the first target RPM for a first time, performing deceleration rotation in which the rotational speed of the drum is kept at a lower value than in the second-stage rotation and hot air is supplied into the drum via a heater, and performing third-stage rotation including second acceleration in which the drum is accelerated to a second target RPM after the deceleration rotation ends and second constant-speed rotation in which the drum is rotated at the second target RPM for a second time that differs from the first time.

The second target RPM may be greater than the first target RPM, and the second time may be greater than the first time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
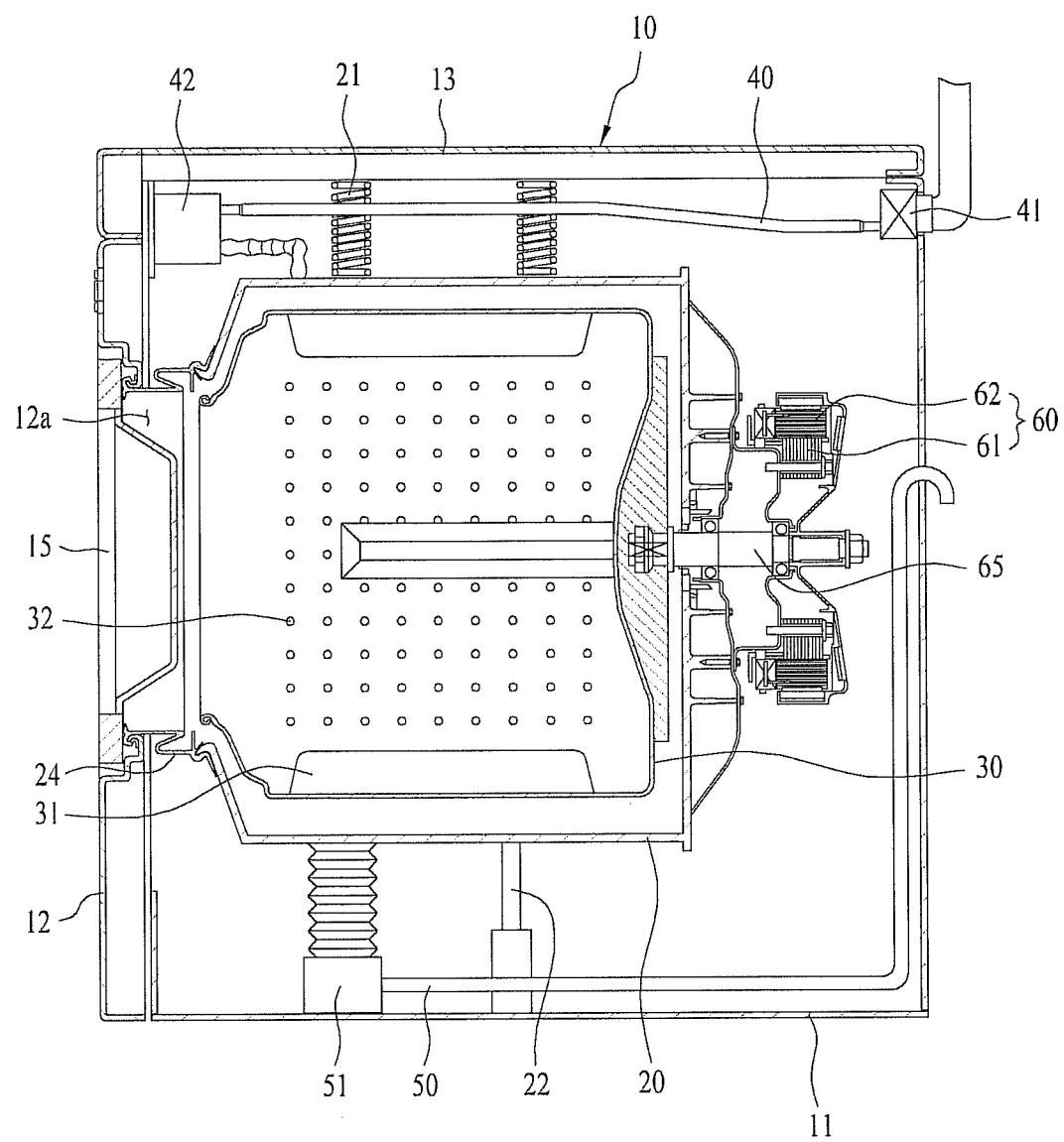
FIG. 1 is a sectional view illustrating a configuration of a washing machine to which a control method according to the present invention is applied.

Hereinafter, exemplary embodiments of the present invention to realize the above described objects will be described in detail with reference to the accompanying drawings.

It will be appreciated that sizes, shapes or the like of constituent elements illustrated in the drawings may be exaggerated for clarity and convenience of description. Also, terms specifically defined in consideration of configurations and operations of the present invention may be replaced by other terms based on intensions of users and managers or customs. Accordingly, it should be noted that the terms used herein should be construed based on the whole content of this specification.

FIG. 1 is a sectional view illustrating a configuration of a washing machine to which a control method according to the present invention is applied. The washing machine will hereinafter be described with reference to FIG. 1.

The washing machine according to the present invention may include a cabinet 10 defining an external appearance of the washing machine, a tub 20 disposed within the cabinet 10, the tub 20 being configured to store wash water therein, a drum 30 rotatably installed within the tub 20, and a motor 60 to drive the drum 30.

The cabinet 10 includes a main body 11 that defines lateral surfaces, a rear surface and a bottom surface of the washing machine, a front plate 12 coupled to the main body 11 to define a front surface of the cabinet 10, and a top plate 13 coupled to an upper end of the main body 11 to define an upper surface of the cabinet 10.

The front plate 12 that defines the front surface of the cabinet 10 has an entrance 12a for input of laundry. A door 15 is pivotally coupled to the cabinet 10 to open or close the entrance 12a.

The tub 20 serves for storage of wash water. The tub 20 is positioned within the cabinet 10 via a support member 21 and a damper 22. The support member 21 may be a hanging spring to catch and secure the top of the tub 20.

One end of the support member 21 is connected to the top plate 13 and the other end is connected to the top of the tub 20.

The damper 22 is located below the tub 20 and serves to alleviate vibration generated during high-speed rotation of the drum 30.

For reference, differently from illustration of FIG. 1, a plurality of dampers 22 and a plurality of support members 21 may be provided. When using the plurality of dampers 22 and the plurality of support members 21, instead of installation positions as illustrated in FIG. 1, they are oriented towards respective corners of a rectangular cross section when viewing the cabinet 10 from the front side thereof, thereby serving to stably secure the tub 20. Of course, modifications in which the dampers 21 and the support members 21 are secured at various other positions in different ways are possible.

Lifters 31 are arranged on an inner circumferential surface of the drum 30 to lift laundry input into the drum 30 to a predetermined position.

Also, a plurality of through-holes 32 is perforated in the drum 30 to allow wash water contained in the laundry to be discharged into the tub 20 during dehydration.

A water supply hose 40 is arranged above the tub 20 to supply water into the tub 20 from the outside of the cabinet 10.

The water supply hose 40 may be equipped with a water supply valve 41 to control supply of water and a detergent supply device 42 to allow the water supplied through the water supply hose 40 to be introduced into the tub 20 along with detergent.

A drain hose 50 and a drain pump 51 may be arranged below the tub 20 to discharge the used wash water to be discharged outward from the cabinet 10.

The motor 60 to rotate the drum 30 is installed to a rear surface of the tub 20. The motor 60 includes a rotating shaft 65 penetrating the rear surface of the tub 20. The motor 60 further includes a stator 61 coupled to the rear surface of the tub 20 and a rotor 62 that rotates via electromagnetic interaction with the stator 61.

A gasket 24 is installed to a front surface of the tub 20 to secure the tub 20 and the cabinet 10 to each other, and in turn the door 15 is located inside the gasket 24. That is, the gasket 24 is shaped as having plural pleats and connects the door 15 and the tub 20 to each other.

Figure 2:
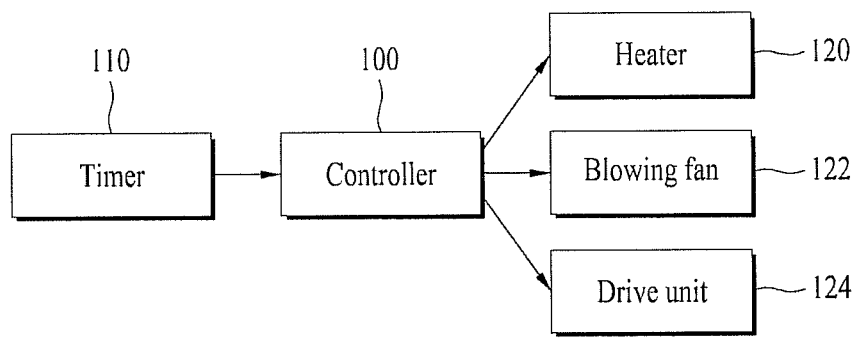
FIG. 2 is a block diagram of the washing machine to which the control method according to the present invention is applied.

FIG. 2 is a block diagram of the washing machine to which the control method according to the present invention is applied. A description with reference to FIG. 2 will follow.

In the present invention, a timer 110 is provided to measure the time required for each operation or the use time of each constituent element.

The time measured by the timer 110 is transmitted to a controller 110 to assist the controller 110 in controlling various constituent elements of the washing machine.

The controller 100 determines, based on a wash course selected by a user, whether or not to perform each cycle, whether or not to perform water supply, washing, rinsing, drainage, dehydration, and/or drying within each cycle, or how long and how many times each operation is to be performed, and performs the respective operations of each cycle.

In the present invention, a heater 120 is used to supply hot air, and the controller 100 may supply the hot air to the laundry accommodated in the drum 30 by determining whether or not to drive the heater 120.

Additionally, a blowing fan 122 is provided to transport the hot air generated from the heater 120 into the drum 30. The blowing fan 122 and the heater 120 may be driven independently of each other. As such, if the blowing fan 122 and the heater 120 are driven simultaneously, the hot air may be supplied to the laundry accommodated in the drum 30. On the other hand, if the blowing fan 122 is driven while the heater 120 is not driven, unheated air may be supplied to the laundry accommodated in the drum 30. The blowing fan 122 may also serve to circulate air through the cabinet 10 and the drum 30.

The controller 100 may control a drive unit 124 including the motor 60. If the controller 100 actuates the drive unit 124, the drum 30 may be continuously or intermittently rotated forward or in reverse. The controller 100 may function to adjust the actuation time or the actuation interval of the drive unit 124 using the timer 110.

Figure 3:
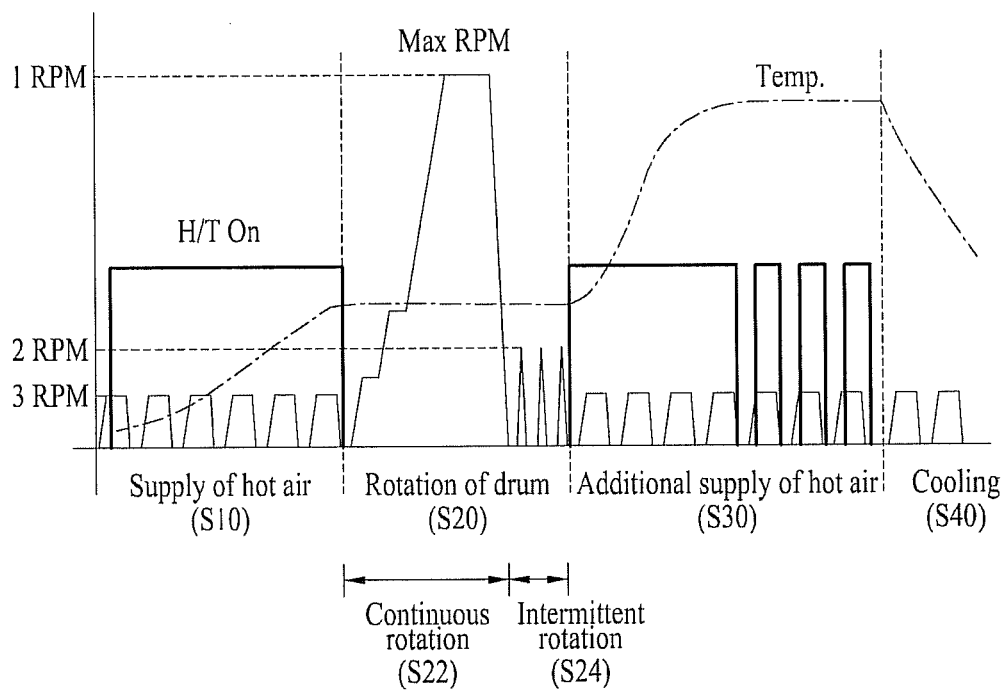
FIG. 3 is a treatment flowchart according to a first embodiment of the present invention.

FIG. 3 is a treatment flowchart according to a first embodiment of the present invention. A description with reference to FIG. 3 will follow.

The control method according to the first embodiment of the present invention may include supplying hot air to laundry (S10) and rotating the drum 30 to remove water contained in the laundry (S20).

In this case, the supply of hot air S10 and the rotation of the drum S20 may correspond to a drying cycle of the entire laundry treatment process of the washing machine (in the sequence of a washing cycle, a rinsing cycle, a dehydration cycle, and a drying cycle). Using the drying cycle consisting of the supply of hot air S10 and the rotation of the drum S20, the supply of hot air S10 may begin immediately after the dehydration cycle ends, or the supply of hot air S10 and the rotation of the drum S20 may be performed when a predetermined time has passed after the drying cycle begins.

On the other hand, the supply of hot air S10 and the rotation of the drum S20 may correspond to a dehydration cycle of the entire laundry treatment process of the washing machine (in the sequence of a washing cycle, a rinsing cycle, a dehydration cycle, and a drying cycle). Using the dehydration cycle consisting of the supply of hot air S10 and the rotation of the drum S20, the drying cycle to dry the laundry does not begin until the two operations end. Additionally supplying hot air to the laundry is possible during the drying cycle.

In the supply of hot air S10, hot air may be supplied into the drum 30 in which the laundry is accommodated as the heater 120 to supply hot air is driven. As such, the supply of hot air S10 provides heating of the drum 30, which increases the interior temperature of the tub 20 as well as the drum 30.

During implementation of the supply of hot air S10, the heater 120 may be continuously driven. Once hot air is supplied to the laundry, surface tension of moisture contained in the laundry is reduced, which may facilitate easy separation of the moisture from the laundry.

In the supply of hot air S10, the drum 30 may be rotated at a predetermined RPM. In this case, the drum 30 may be intermittently rotated, rather than being continuously rotated. That is, rotation and pause of the drum 30 may be iteratively performed.

On the other hand, in the rotation of the drum S20, driving of the heater 120 is paused. Thus, there is no increase in the interior temperature of the drum 30.

In this case, the rotation of the drum S20 may include continuously rotating the drum 30 at a first RPM (S22) and intermittently rotating the drum 30 at a second RPM (S24). The intermittent rotation 24 is performed after the continuous rotation 22 is performed.

In particular, in the continuous rotation S22, an RPM of the drive unit 124 preferably shows a stepwise increase until it reaches the first RPM.

In this case, as illustrated in FIG. 3, the first RPM may be greater than the second RPM. The first RPM may be the maximum RPM of the drum 30 during a dehydration cycle. The first RPM is the greatest available RPM of the washing machine, and thus may apply the greatest rotational force to laundry.

During implementation of the continuous rotation S22 in which the drum 30 is rotated at the first RPM, laundry may be adhered to the inner circumferential surface of the drum 30. Therefore, when attempting to dry the laundry by supplying the hot air into the drum 30 immediately after implementation of the continuous rotation S22, it is difficult to ensure uniform ejection of the hot air throughout the laundry and also to achieve excellent laundry drying efficiency because the laundry remains entangled. Accordingly, in the embodiment of the present invention, the continuous rotation S22 is directly followed by the intermittent rotation S24.

Meanwhile, in the intermittent rotation S24, a set of RPM increase to the second RPM and rotation pause in sequence may be iteratively performed.

In the intermittent rotation S24, the controller 100 controls rotation or pause of the drum 30 to prevent the laundry within the drum 30 from being adhered to the inner circumferential surface of the drum 30. That is, in the intermittent rotation S24, the drive unit 124 iteratively performs rapid acceleration and braking of the drum 30, thereby causing the laundry within the drum 30 to be disentangled.

In the intermittent rotation S24, a set of laundry drop and high-speed rotation of the drum 30 in a given direction in sequence is iterated. In this case, the entangled laundry within the drum 30 is disentangled by high falling shock.

On the other hand, in the supply of hot air S10, the drum 30 may be rotated at a third RPM for a predetermined time. In this case, the third RPM may be less than the second RPM. Also, in the supply of hot air S10, rotation and pause of the drum 30 may be iteratively performed.

As illustrated in FIG. 3, during implementation of the supply of hot air S10 and the rotation of the drum S20, the blowing fan 122 may be actuated to guide hot air into the drum 30. In this case, the blowing fan 122 may be continuously actuated without pause thereof.

In the rotation of the drum S20, the heater 120 is not driven, but hot air, which has already been generated by the heater 120 and directed into the drum 30, is circulated by the blowing fan 122 within the cabinet 10. On the other hand, the interior air of the drum 30 may be discharged from the cabinet 10 by the blowing fan 122.

After the rotation of the drum S20 ends, additional supply of hot air to the laundry may further be performed (S30). For user convenience, implementation of additional another process may be interposed between the supply of the drum S20 and the additional supply of hot air S30.

In the additional supply of hot air S30, the heater 120 is driven, and the blowing fan 122 is driven to guide the hot air generated by the heater 120 into the drum 30. This may raise the interior temperature of the drum 30 as can be appreciated from FIG. 3. Differently from in the supply of hot air S10, it is noted that the heater 120 may be intermittently driven in the additional supply of hot air S30.

In the additional supply of hot air S30, the drum 30 is rotated at the third RPM for a predetermined time, and rotation and pause of the drum 30 may be iteratively performed. In this case, the third RPM may be equal to the third RPM in the supply of hot air S10. Alternatively, the RPM of the drum 30 applied to the additional supply of hot air S30 may differ from the RPM of the drum 30 applied to the supply of hot air S10.

After the additional supply of hot air S30 ends, cooling of the laundry may further be performed (S40). In the cooling of laundry S40, the laundry accommodated in the drum 30 is exposed to high temperature, and therefore the user may burn or suffer from inconvenience when pulling the laundry outward. For this reason, dropping the temperature of the laundry may be necessary after the additional supply of hot air S30 ends.

Preferably, the heater 120 to generate hot air is not driven in the cooling of laundry S40. When driving only the blowing fan 122 without driving of the heater 120, the air filled in the drum 30 may be discharged through a drain hole of the cabinet 10, for example. Through discharge of the hot air filled in the drum 30, the temperature of the laundry as well as the interior temperature of the drum 30 may drop.

Meanwhile, even in the cooling of laundry S40, the drum 30 may be rotated at a predetermined RPM to ensure that the laundry within the drum 30 is efficiently cooled owing to smooth heat exchange between the laundry and the air being circulated or exhausted. In this case, the drum 30 may be rotated at the third RPM, and may be continuously or intermittently rotated.

Figure 4:
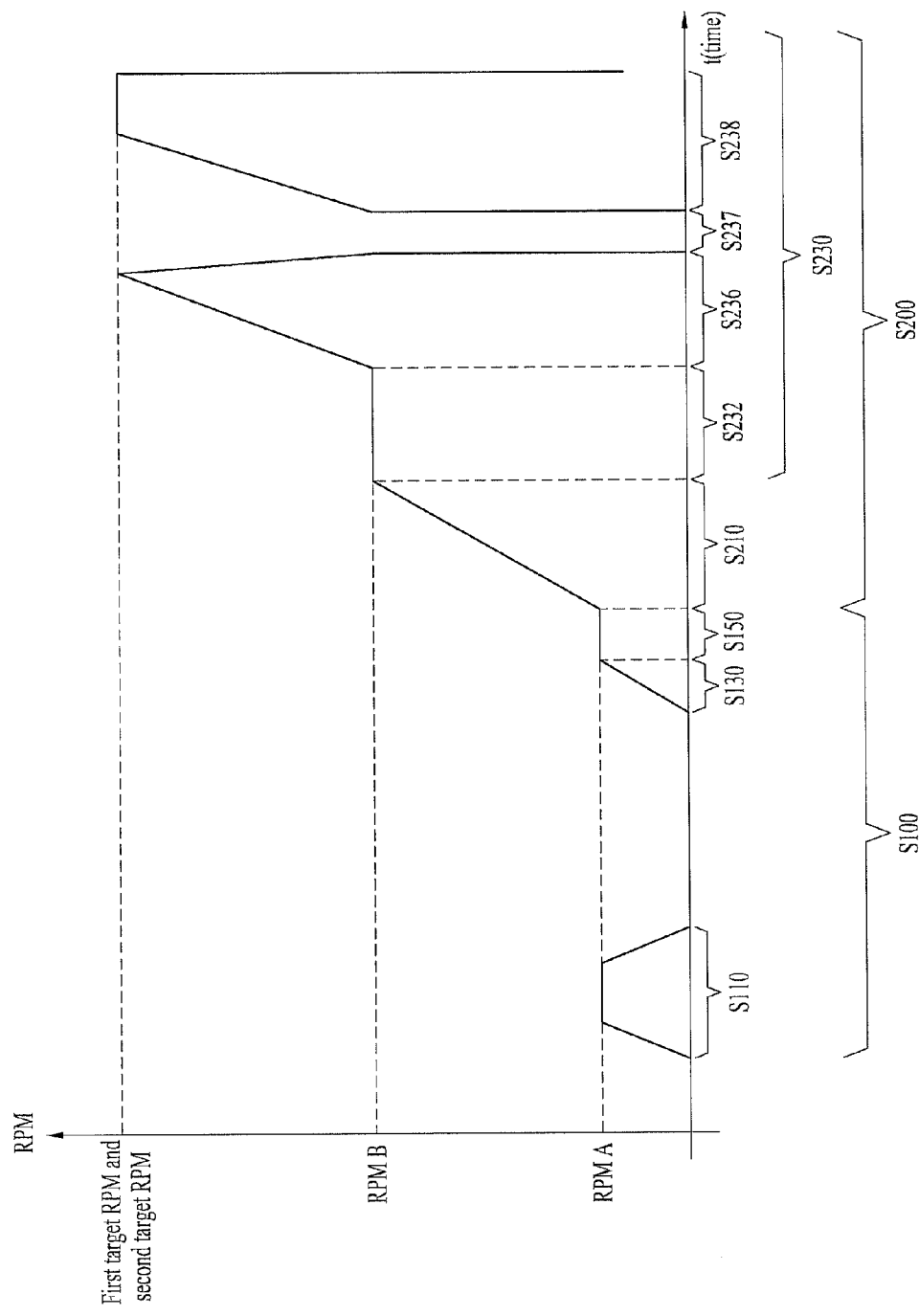
FIG. 4 is a treatment flowchart according to a second embodiment of the present invention.

FIG. 4 is a treatment flowchart according to a second embodiment of the present invention. More specifically, FIG. 4 is a graph illustrating change in the RPM of the drum 30 over time. In the graph of FIG. 4, the abscissa represents time, and the ordinate represents the RPM of the drum 30, i.e. change of the RPM.

Referring to FIG. 4, the control method of the present invention generally includes laundry dispersion S100 and dehydration S200. In this case, the dehydration S200 performs removal of water from the laundry, and may be applied to a comprehensive dehydration process, or to a part of a drying process.

The laundry dispersion S100 functions to uniformly disperse the laundry within the drum 30 by rotating the drum 30 at a relatively low speed. The dehydration S200 functions to remove moisture from the laundry by rotating the drum 30 at a relatively high speed. However, the laundry dispersion S100 and the dehydration S200 are named based on a main function thereof, and the function of each operation is not limited by the name thereof. For example, even in the laundry dispersion S100, removal of water from the laundry may be achieved via rotation of the drum 30.

In the control method of the present invention, the laundry dispersion S100 includes wet laundry sensing S110, laundry disentanglement S130, and eccentricity sensing S150. The dehydration S200 includes transition band passage S210 and acceleration S230. Hereinafter, the enumerated operations will be described in detail.

After a rinsing cycle ends, the laundry within the drum 30 remains wet. The controller 100 first senses the amount of laundry within the drum 30, i.e. the amount of wet laundry prior to beginning of a dehydration cycle or a drying cycle (S110).

The reason for sensing the amount of wet laundry is because the weight of wet laundry differs from the weight of dry laundry, although the amount of laundry that is not yet wet, i.e. the amount of dry laundry has been sensed at the initial stage of a washing cycle. The sensed amount of wet laundry acts as a factor to determine an acceptable condition for acceleration of the drum 30 in the transition band passage S210 that will be described hereinafter, or to determine reimplementation of the laundry dispersion S100 via deceleration of the drum 30 based on eccentricity of the transition band passage S210.

In the control method of the present invention, to measure the amount of wet laundry within the drum 30, the drum 30 is subjected to constant-speed operation for a predetermined time after accelerated to a RPM A, for example, to a range of about 100 to 110 RPM, and thereafter is decelerated. The measurement of the amount of wet laundry is performed during deceleration. The deceleration of the drum 30 is performed using dynamic braking. More specifically, the amount of wet laundry is sensed from the RPM of the drum 30 during acceleration by the motor 60, the RPM of the drum 30 during deceleration by the motor 60, DC power applied to the motor 60, etc.

Meanwhile, after sensing the amount of wet laundry, the controller 100 performs the laundry disentanglement S130 for dispersion of the laundry within the drum 30.

The laundry disentanglement S130 serves to uniformly disperse the laundry within the drum 30, thereby preventing the laundry from being gathered in a specific region of the drum 30 and from increasing the eccentricity of the drum 30. This is because the increased eccentricity causes excessive noise and vibration when the RPM of the drum 30 is increased. More specifically, the laundry disentanglement S130 is performed until the drum 30 having a predetermined gradient is accelerated in a given direction and reaches the RPM of the eccentricity sensing S150 that will be described below.

Subsequently, the controller 100 senses the eccentricity of the drum 30 (S150).

If the laundry within the drum 30 is not uniformly dispersed and is gathered in a specific region of the drum 30, the eccentricity of the drum 30 is increased, which may cause noise and vibration when the RPM of the drum 30 is increased later. Accordingly, the controller 100 determines whether or not the drum 30 is accelerated by sensing the eccentricity of the drum 30.

The sensing of eccentricity utilizes acceleration variation when the drum 30 is rotated. That is, when the drum 30 is rotated based on the eccentricity thereof, there is an acceleration difference between downward rotation in the direction of gravity and upward rotation in a direction opposite to the direction of gravity. The controller 100 may measure the eccentricity of the drum 30 using a speed sensor, such as a hall sensor, provided at the drive motor 60 based on the acceleration difference. During sensing the eccentricity of the drum 30, although the drum 30 performs rotation, it is necessary for the laundry within the drum 30 to remain adhered to the inner circumferential surface of the drum 30 rather than falling down. To this end, the drum 30 is rotated in a range of about 100 to 110 RPM.

If the drum 30 having a predetermined amount of wet laundry is accelerated to a high speed when the sensed eccentricity of the drum 30 exceeds a reference eccentricity, noise and vibration of the drum 30 are remarkably increased, which makes it difficult to accelerate the drum 30. The controller 100 may store a data table in which a reference eccentricity to allow acceleration based on the amount of wet laundry is preset. As such, the controller 100 may determine whether or not to accelerate the drum 30 by applying the sensed amount of wet laundry and the eccentricity of the drum 30. That is, if the eccentricity depending on the sensed amount of wet laundry exceeds the reference eccentricity, accelerating the drum 30 is impermissible due to the excessive eccentricity. Thus, a set of the wet laundry sensing S110, the laundry disentanglement S130, and the eccentricity sensing S150 as described above is iterated.

Meanwhile, a set of the wet laundry sensing S110, the laundry disentanglement S130, and the eccentricity sensing S150 as described above may be iterated until the sensed eccentricity satisfies a requirement in that it is must be equal to or less than the reference eccentricity. However, if the washing machine malfunctions or if the laundry within the drum 30 is severely entangled, the sensed eccentricity may be not equal to or less than the reference eccentricity and iteration of a set of the wet laundry sensing S110, the laundry disentanglement S130, and the eccentricity sensing S150 may be iterated. Thus, if a predetermined time, for example, about 20 to 30 minutes has passed without acceleration of the drum 30 after a dehydration cycle begins, preferably, the controller 100 may stop rotation of the drum 30 and inform the user that the dehydration cycle did not normally end.

If the above described acceleration permission requirement in that the eccentricity depending on the sensed amount of wet laundry is equal to or less than the reference eccentricity is satisfied, the following transition band passage S210 is performed.

Here, the term 'transition band' may be defined as a predetermined RPM band including more than one resonance frequency at which a vibration system of the washing machine undergoes resonance. That is, the transition band is an inherent vibration characteristic parameter of the vibration system of the washing machine. Thus, the transition band is varied based on the vibration system of the washing machine, and for example, is in a range of about 200 to 270 RPM. Alternatively, the transition band may be in a range of about 200 to 350 RPM.

That is, when the RPM of the drum 30 passes the transition band, the washing machine undergoes resonance, which generates remarkable noise and vibration of the washing machine. The nose and vibration of the washing machine may annoy the user and may hinder acceleration of the drum 30. Thus, when passing the transition band, it is preferable to minimize noise and vibration during acceleration of the drum 30 by appropriately adjusting an acceleration gradient.

Meanwhile, the eccentricity of the drum 30 may be increased as the drum 30 is accelerated during passage of the transition band, or by unexpected shock applied to the drum 30. If the eccentricity of the drum 30 exceeds a predetermined value, remarkably increased noise is generated and it is difficult to continuously accelerate the drum 30. Thus, the controller 110 requires to continuously sense the eccentricity of the drum 30 during passage of the transition band.

To this end, the drum 30 of the washing machine may be equipped with a vibration sensor such that the controller 100 senses vibration of the drum 30 during passage of the transition band. If the sensed vibration and/or eccentricity of the drum 30 exceeds a predetermined value in the transition band passage S210, the controller 100 decelerates the drum 30, and iterates a set of the wet laundry sensing S110, the laundry entanglement S130, and the eccentricity sensing S150 as described above.

Subsequent to the transition band passage S210, the controller 100 performs the acceleration S230.

In the present embodiment, the acceleration S230 includes first acceleration S236 to accelerate the drum 30 to a first target RPM, deceleration S237 to decelerate the drum 30 to a predetermined RPM, and second acceleration S238 to accelerate the drum 30 to a second target RPM.

The controller 100 first increases the rotational speed of the drum 30 to the first target RPM, so as to remove moisture (S236). Here, although the first target RPM may be set to equal to the second target RPM of the second acceleration S238, the maintenance time of the first target RPM is set to less than the maintenance time of the second target RPM.

More specifically, in the acceleration 230, the drum 30 is accelerated to a desired relatively high RPM required to extract water from the laundry. During acceleration, water is extracted from the laundry by centrifugal force. The extraction rate of water is varied based on the kind of laundry. That is, water may be easily extracted from soft laundry, such as knitwear, and may not be easily extracted from laundry such as jeans.

Subsequently, the controller 100 performs the deceleration S237 in which the drum 30 is almost paused or is rotated at a lower speed than the rotational speed A (RPM A). Thereafter, the second acceleration S238 in which the drum 30 is rotated to the second target RPM that is equal to the first target RPM is performed.

Figure 5:
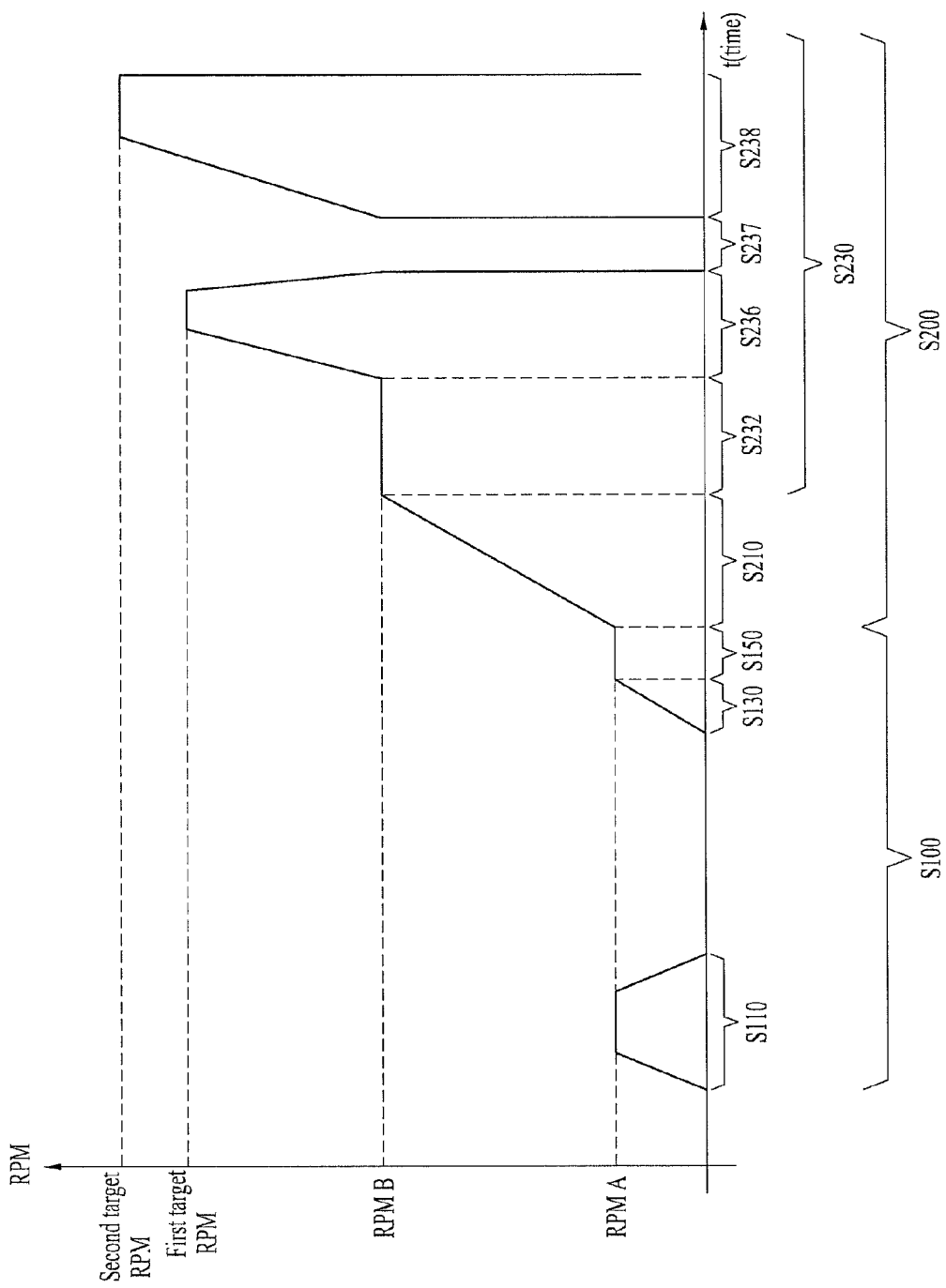
FIG. 5 is a treatment flowchart according to a third embodiment of the present invention.

FIG. 5 is a treatment flowchart according to a third embodiment of the present invention. The present embodiment has a difference in that the first target RPM differs from the second target RPM as compared to the above described second embodiment. The following description is focused on such difference.

Referring to FIG. 5, in the present embodiment, the first target RPM of the first acceleration S236 differs from the second target RPM of the second acceleration S238. Furthermore, the first target RPM of the first acceleration S236 may be less than the second target RPM of the second acceleration S238. In the case of the above described embodiment of FIG. 4, the first target RPM and the second target RPM may be set to equal to each other, and therefore noise caused by change of the eccentricity in the first acceleration S236 may be excessively increased beyond a permissible value. The dehydration noise may annoy the user, and it is necessary to reduce noise in the first acceleration S236. Accordingly, to reduce the noise in the first acceleration S236, the first target RPM is set differently from the second target RPM, and is preferably set to less than the second target RPM. Setting the first target RPM to less than the second target RPM may reduce generation of noise during a dehydration cycle.

Meanwhile, the first RPM in the first acceleration S236 may be set to achieve a preset noise criterion in the following second acceleration S238. That is, the noise criterion of the washing machine may be set based on a dehydration cycle in which the drum 30 is rotated at the maximum speed. In the control method of the present embodiment, the noise criterion is set based on noise at the second target RPM of the second acceleration S238.

Figure 6:
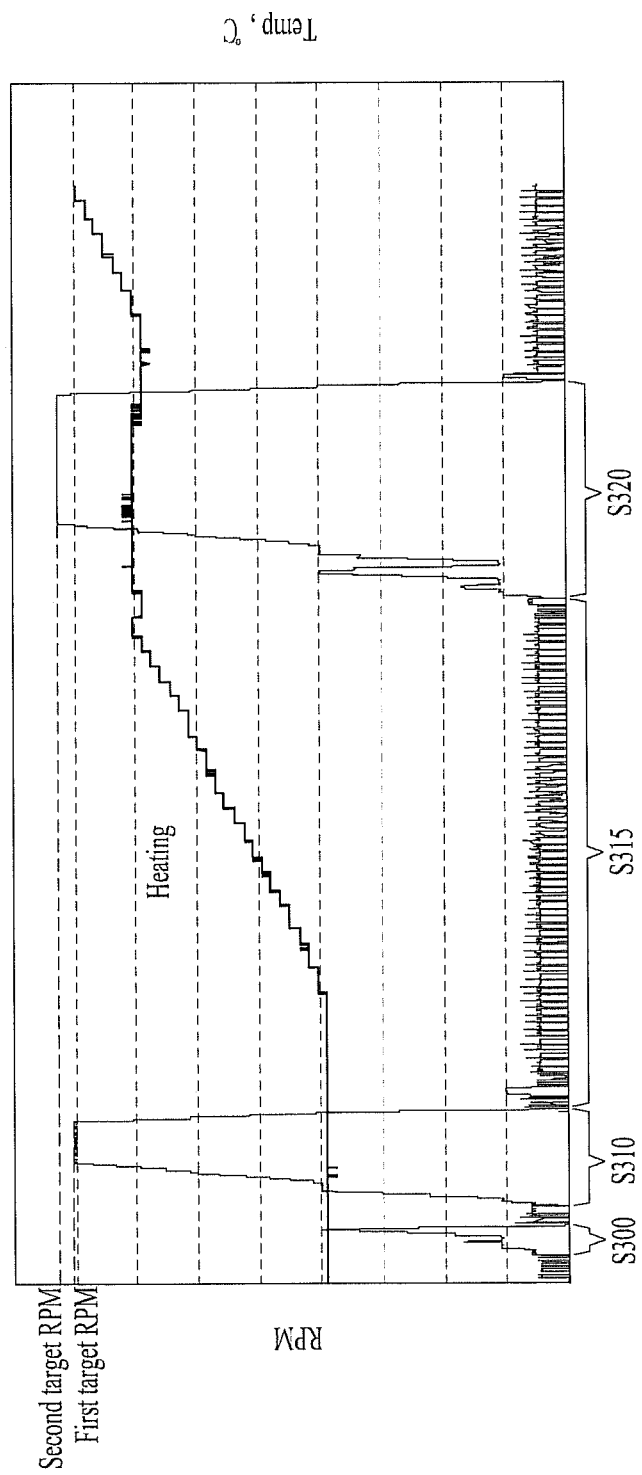
FIG. 6 is a treatment flowchart according to a fourth embodiment of the present invention.

FIG. 6 is a treatment flowchart according to a fourth embodiment of the present invention. A description with reference to FIG. 6 will follow.

The present embodiment provides a control method of a washing machine including rotating the drum 30 at a predetermined rotational speed (hereinafter referred to as first-stage rotation S300), rotating the drum 30 when a predetermined time has passed after the first-stage rotation ends (hereinafter referred to as second-stage rotation S310), performing constant-speed rotation of the drum 30 at lower rotational speed than in the second-stage rotation (hereinafter referred to as deceleration rotation S315), and rotating the drum 30 at a higher speed than in the deceleration rotation (hereinafter referred to as third-stage rotation S320).

Here, the first-stage rotation S300 may correspond to wet laundry sensing in which the amount of wet laundry is sensed, the second-stage rotation S310 may correspond to first acceleration in which the drum 30 is accelerated to a first target RPM, and the third-stage rotation S320 may correspond to second acceleration in which the drum 30 is accelerated to a second target RPM.

Meanwhile, in the deceleration rotation S315, the drum 30 may be decelerated and rotated at a lower rotational speed than the first target RPM.

Also, in the deceleration rotation S315, rotation and pause of the drum 30 may be iteratively performed.

Alternatively, the drum 30 may remain paused in the deceleration rotation S315.

In this case, the first target RPM may differ from the second target RPM.

In the deceleration rotation S315, hot air may be supplied into the drum 30.

In particular, hot air may be supplied when a predetermined time has passed after the deceleration rotation S315 begins.

Of course, supply of hot air into the drum 30 may be performed after the third-stage rotation S320 ends.

The control method according to the fourth embodiment may adopt a similar change pattern in the rotational speed of the drum 30, and may supply hot air into the drum 30 by driving the heater 120 in the same manner as in the first embodiment.

Similar to the third embodiment, in the fourth embodiment, the drum 30 may be rotated to remove water contained in the laundry as the rotational speed of the drum 30 is varied differently in the first-stage rotation S300, the second-stage rotation S310, and the third-stage rotation S320.

In the first-stage rotation S300, the drum 30 may be rotated such that the drum 30 reaches a predetermined RPM (about 400 RPM). In the first-stage rotation S300, once the rotational speed of the drum 30 has reached the predetermined RPM, the rotational speed of the drum 30 may be reduced to stop the drum 30.

In the second-stage rotation S310, the drum 30 may be rotated such that the drum 30 reaches the first target RPM (about 800 RPM). In the second-stage rotation S310, once the drum 30 has reached the first target RPM, the drum 30 may be continuously rotated for a predetermined time.

In the third-stage rotation S320, the drum 30 may be rotated such that the drum 30 reaches the second target RPM (a specific numerical value greater than about 800 RPM). Similarly, in the third-stage rotation S320, once the drum 30 has reached the second target RPM, the drum 30 may be continuously rotated for a predetermined time.

The second-stage rotation S310 may be performed when a predetermined time has passed after the first-stage rotation S300 ends.

In the fourth embodiment, the deceleration rotation S315 in which the drum 30 is rotated at a lower rotational speed than in the first-stage rotation S300 may be included between the second-stage rotation S310 and the third-stage rotation S320. In the deceleration rotation S315, the drum 30 preferably has a lower rotational speed than in the first-stage rotation S300 and in the second-stage rotation S310. Of course, the deceleration rotation S315 may iteratively perform rotation and pause of the drum 30 in such a manner that the drum 30 is paused for a constant time and then again rotated. Additionally, in the deceleration rotation S315, the drum 30 may remain paused as in the above described second embodiment or third embodiment.

The deceleration operation S315 is performed for a predetermined time, and causes change in the rotational speed of the drum 30 between the second-stage rotation S310 and the third-stage rotation S320.

The first-stage rotation S300 may correspond to the wet laundry sensing S110 of the above described third embodiment, the second-stage rotation S310 may correspond to the first acceleration S236 of the above described third embodiment, and the third-stage rotation S320 may correspond to the second acceleration S238 of the above described third embodiment. These corresponding operations between the third embodiment and the fourth embodiment may have a similar pattern with respect to the rotation of the drum 30, and may realize substantially the same desired laundry treatment function. Of course, these corresponding operations may have similarity only in relation to the general rotation pattern of the drum 30, and may have a difference in detailed functions that are performed specifically in view of the entire process.

Similarly, the deceleration rotation S315 may perform a similar function to the deceleration S237 of the third embodiment.

More specifically, the control method of the washing machine according to the present embodiment includes the first-stage rotation S300 in which the drum 30 is rotated at a predetermined rotational speed, the second-stage rotation S310 in which the drum 30 is rotated at the first target RPM when a predetermined time has passed after the first-stage rotation ends, the deceleration rotation S315 in which the drum 30 is decelerated and rotated at a lower rotational speed than in the second-stage rotation, and the third-stage rotation S320 in which the drum 30 is rotated at the second target RPM that is a greater than the rotational speed of the drum 30 in the deceleration rotation.

The first-stage rotation S300 may include wet laundry sensing in which the amount of wet laundry is sensed. As described above, the first-stage rotation S300 may include laundry disentanglement to disperse the laundry within the drum 30, and eccentricity sensing to sense the eccentricity of the drum 30.

The second-stage rotation S310 may include first acceleration in which the drum 30 is accelerated to the first target RPM, and first constant-speed rotation in which the drum 30 is continuously rotated at the first target RPM for a first time. The third-stage rotation S320 may include second acceleration in which the drum 30 is accelerated to the second target RPM, and second constant-speed rotation in which the drum 30 is continuously at the second target RPM for a second time.

As described above, in the deceleration rotation S315, rotation and pause of the drum 30 may be iteratively performed.

Here, the first target RPM may differ from the second target RPM. In an embodiment, the second target RPM may be greater than the first target RPM.

Similarly, the first time may differ from the second time. In an embodiment, the second time may be greater than the first time.

Also, the deceleration rotation S315 may be performed for a longer time than in the second-stage rotation S310 and in the third-stage rotation S320. In the deceleration rotation S315, hot air may be supplied into the drum 30 via the heater 120.

Meanwhile, the hot air may be supplied when a predetermined time has passed after the deceleration rotation S315 begins.

As the interior air of the drum 30 is heated when a predetermined time has passed after the hot air is supplied, actuation of the heater 120 may stop when the third-stage rotation S320 begins, so as to circulate the heated interior air of the drum 30.

Also, supply of hot air into the drum 30 may be performed after the third-stage rotation S320 ends.

After the third-stage rotation S320 ends, the deceleration rotation S315 in which the rotational speed of the drum 30 is kept at a lower value than in the second-stage rotation S310 may be performed.

More specifically, as can be appreciated from FIG. 6, the heater 120 may be driven to raise the interior temperature of the drum 30 between the second-stage rotation S310 and the third-stage rotation S320. That is, the interior temperature of the drum 30 remains in a range of about 25° C. to 28° C. during implementation of the first-stage rotation S300 and the second-stage rotation S310, and then the heater 120 may be actuated when a predetermined time has passed after the second-stage rotation S310 ends. It can be appreciated that the interior temperature of the drum 30 is increased to a range of about 46° C. to 48° C. via actuation of the heater 120. In particular, the interior temperature of the drum 30 may be increased to about 45° C.

In this case, the heater 120 may be driven simultaneously with the end of the second-stage rotation S310, or may be driven when a predetermined time has passed after the second-stage rotation S310 ends and the deceleration rotation S315 is performed.

Since the deceleration rotation S315 is performed subsequently to the end of the second-stage rotation S310, the drum 30 is rotated at a lower speed than in the second-stage rotation S310, allowing the laundry adhered to the inner circumferential surface of the drum 30 to fall from the inner circumferential surface of the drum 30 and be uniformly dispersed within the drum 30.

For example, if hot air is supplied in a state in which the laundry is adhered to the inner circumferential surface of the drum 30, hot air may be supplied to only one side of the laundry. Also, in a state in which plural pieces of laundry are entangled with one another, hot air may not be supplied to inner pieces of the entangled laundry.

Accordingly, in the deceleration rotation S315, the laundry is separated from the inner circumferential surface of the drum 30 and is uniformly distributed within the drum 30, to ensure that the hot air supplied from the heater 120 is uniformly and easily ejected over the laundry. As such, increasing a contact area between the hot air and the laundry may ensure easy evaporation of moisture contained in the laundry and result in improved laundry drying efficiency.

As is apparent from the above description, according to the present invention, as a result of supplying hot air in a state in which laundry is not adhered to the inner circumferential surface of the drum, it is possible to efficiently remove moisture contained in the laundry using the hot air.

Further, according to the present invention, it is unnecessary to continuously supply hot air to remove the moisture of the laundry, power consumption required to drive the heater may be reduced.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

For example, the control method of the washing machine according to one embodiment includes first-stage rotation in which the drum is rotated at a predetermined rotational speed, second-stage rotation in which the drum is rotated at a first target RPM when a predetermined time has passed after the first-stage rotation ends, deceleration rotation in which hot air is supplied into the drum via a heater while the drum remains rotated at a lower rotational speed than in the second-stage rotation, and third-stage rotation in which the drum is rotated at a second target RPM that is a greater than the rotational speed of the drum in the deceleration rotation and differs from the first target RPM.

In the deceleration rotation, rotation and pause of the drum may be iteratively performed. When the third-stage rotation begins, actuation of the heater stops and the heated air within the drum may be circulated.

Alternatively, the control method of the washing machine according to one embodiment includes first-stage rotation in which the drum is rotated at a predetermined rotational speed, second-stage rotation including first acceleration in which the drum is accelerated to a first target RPM when a predetermined time has passed after the first-stage rotation ends and first constant-speed rotation in which the drum is rotated at the first target RPM for a first time, deceleration rotation in which hot air is supplied into the drum via the heater while the drum remains at lower rotational speed than in the second-stage rotation, and third-stage rotation including second acceleration in which the drum is accelerated to a second target RPM when a predetermined time has passed after the deceleration rotation ends and second constant-speed rotation in which the drum remains rotated at the second target RPM for a second time that differs from the first time.

Here, the second target RPM may be greater than the first target RPM, and the second time may be greater than the first time.

What is claimed is:

1. A control method of a washing machine, the method comprising:
performing first-stage rotation in which a drum is accelerated to rotate at a predetermined rotational speed and is decelerated;
performing second-stage rotation in which the drum is rotated at a first target RPM for a dehydration of a laundry in the drum when a predetermined time has passed after the first-stage rotation ends;
performing deceleration rotation in which the rotational speed of the drum is kept at a lower value than in the first-stage rotation; and
performing third-stage rotation in which the drum is rotated at a second target RPM that is greater than the rotational speed of the drum in the deceleration rotation for a dehydration of a laundry in the drum,
wherein the deceleration rotation is performed for a greater time than in the second-stage rotation and in the third-stage rotation,
wherein the performing of the deceleration rotation includes iteratively performing rotation and pause of the drum to allow the laundry adhered to an inner circumferential surface of the drum to fall from the inner circumferential surface of the drum, and wherein the performing of the deceleration rotation includes supplying hot air into the drum via a heater.

2. The control method according to claim 1, wherein the performing of the first-stage rotation includes sensing the amount of wet laundry.

3. The control method according to claim 1, wherein the first target RPM differs from the second target RPM.

4. The control method according to claim 3, wherein the second target RPM is greater than the first target RPM.

5. The control method according to claim 1, wherein the hot air is supplied when a predetermined time has passed after the deceleration rotation begins.

6. The control method according to claim 1, wherein actuation of the heater stops and heated air within the drum is circulated when the third-stage rotation begins.

7. The control method according to claim 1, wherein the hot air is supplied into the drum after the third-stage rotation ends.

8. The control method according to claim 7, wherein the performing of the deceleration rotation in which the rotational speed of the drum is kept at a lower value than in the first-stage rotation occurs after the third-stage rotation ends.

9. The control method according to claim 1, wherein the performing of the first-stage rotation includes disentangling laundry to disperse laundry within the drum, and sensing eccentricity of the drum.

10. The control method according to claim 1, wherein actuation of the heater stops when a predetermined time has passed after the hot air is supplied and before the deceleration rotation stops.

11. The control method according to claim 1, wherein the performing of the second-stage rotation includes performing first acceleration in which the drum is accelerated to the first target RPM and performing first constant-speed rotation in which the drum is rotated at the first target RPM for a first time, and wherein the performing of the third-stage rotation includes performing second acceleration in which the drum is accelerated to the second target RPM and performing second constant-speed rotation in which the drum is rotated at the second target RPM for a second time.

12. The control method according to claim 11, wherein the first time and the second time differ from each other.

13. The control method according to claim 11, wherein the second time is greater than the first time.

14. The control method according to claim 11, wherein the second constant-speed rotation occurs after the second acceleration.

* * * * *